United States Patent [19]

Johnston

[11] 4,310,138

[45] Jan. 12, 1982

[54] SELF-SUPPORTING SHRINKING MANDREL

[76] Inventor: George S. Johnston, 6390 Bridgewood Valley Dr., Atlanta, Ga. 30328

[21] Appl. No.: 160,603

[22] Filed: Jun. 18, 1980

[51] Int. Cl.³ .............................................. B28B 7/30
[52] U.S. Cl. .................................... 249/180; 249/178; 249/179; 425/470
[58] Field of Search ................. 425/470; 249/178, 180, 249/179

[56] References Cited

U.S. PATENT DOCUMENTS 3,248,756  3/1966  Mills et al. ........................ 249/180
4,130,264 12/1978  Schröer ............................. 249/180

FOREIGN PATENT DOCUMENTS 2049960  3/1971  France ................................ 249/180

Primary Examiner—James H. Derrington
Attorney, Agent, or Firm—Jones, Thomas & Askew

[57] ABSTRACT

A self supporting shrinking mandrel including an actuator with a plurality of legs, each terminated by a cross member. The legs and cross members are inserted into grooves of a plurality of support members. The grooves and cross members cooperate to hold the support members in place making the entire mandrel self supporting. The actuator is tapered in cross section along the longitudinal axis which causes a positive shrinking action as the support members are drawn toward the longitudinal axis when the actuator is withdrawn from the combination.

6 Claims, 13 Drawing Figures

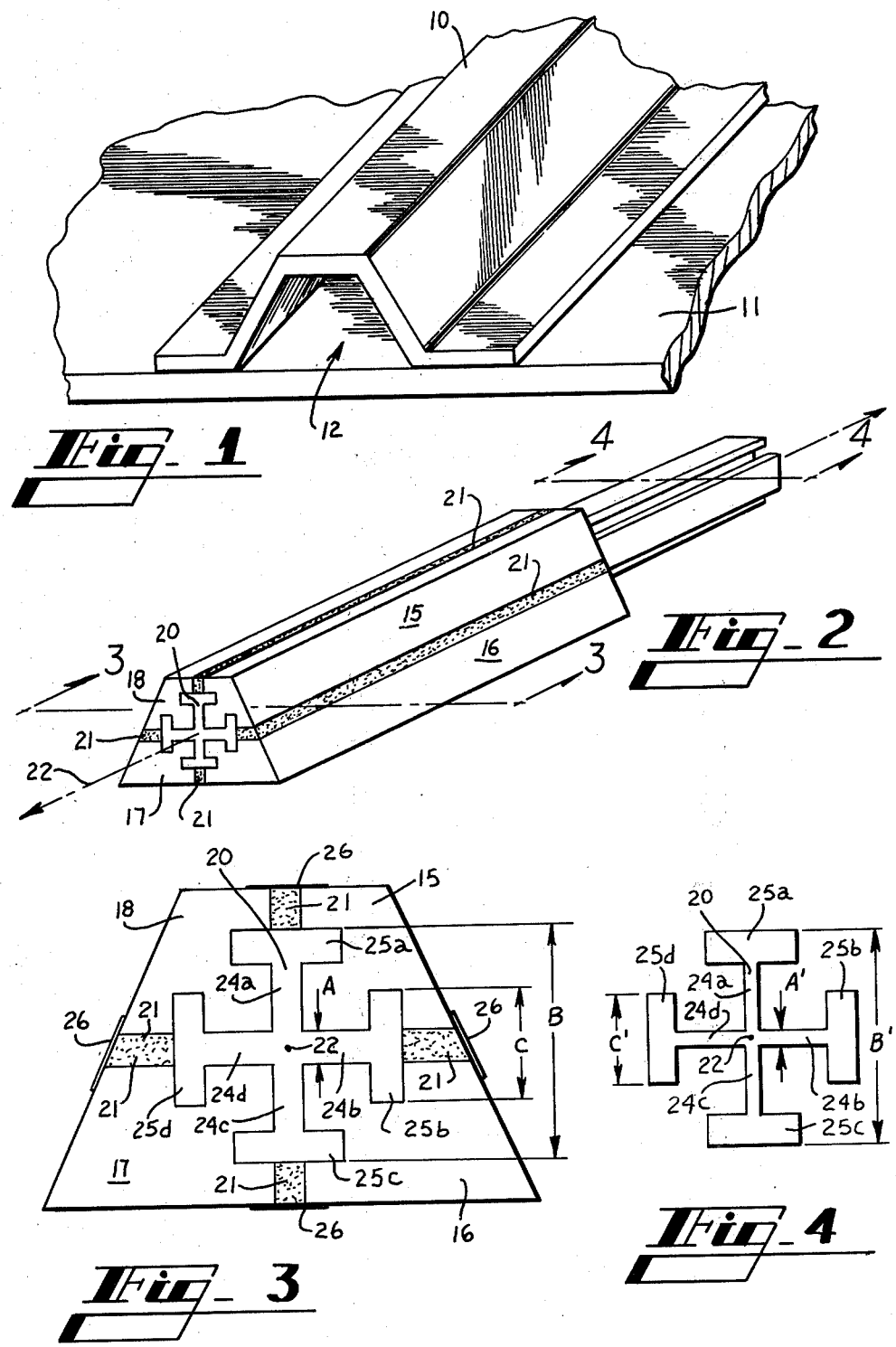

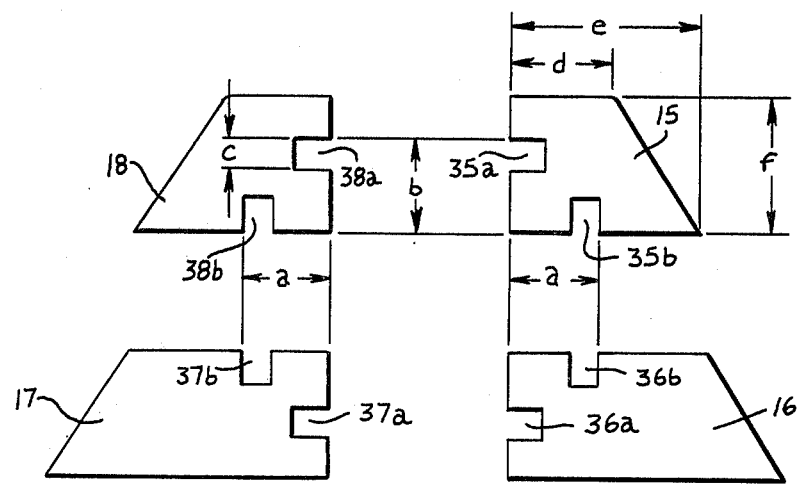
Fig_5A
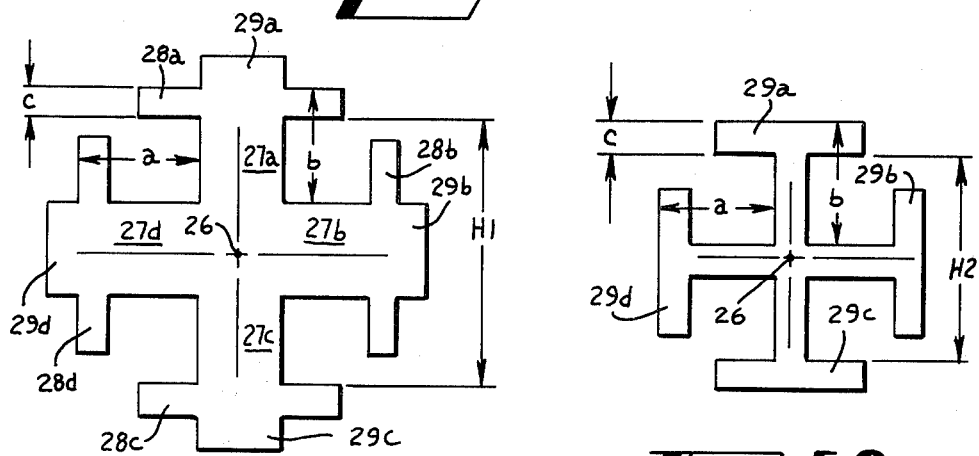
Fig_5B   Fig_5C
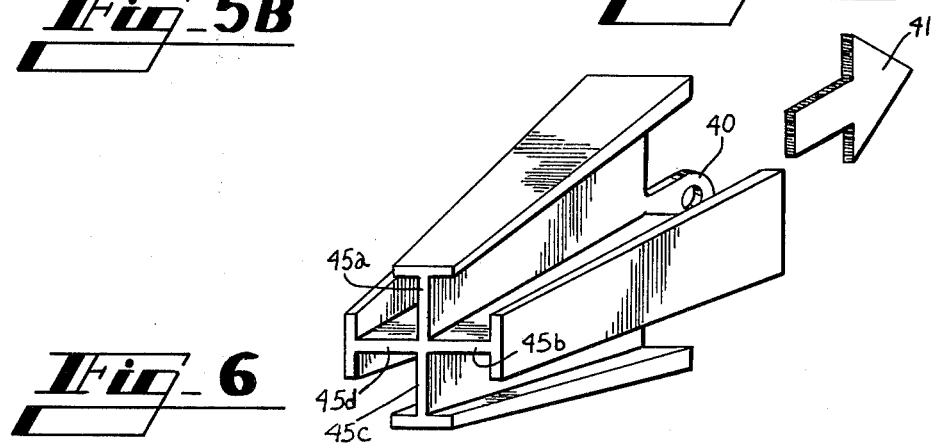
Fig_6

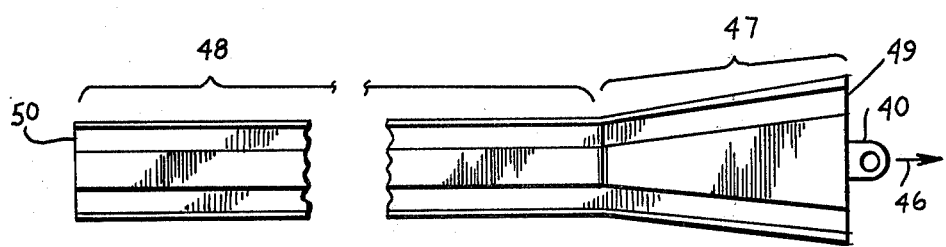
Fig_7
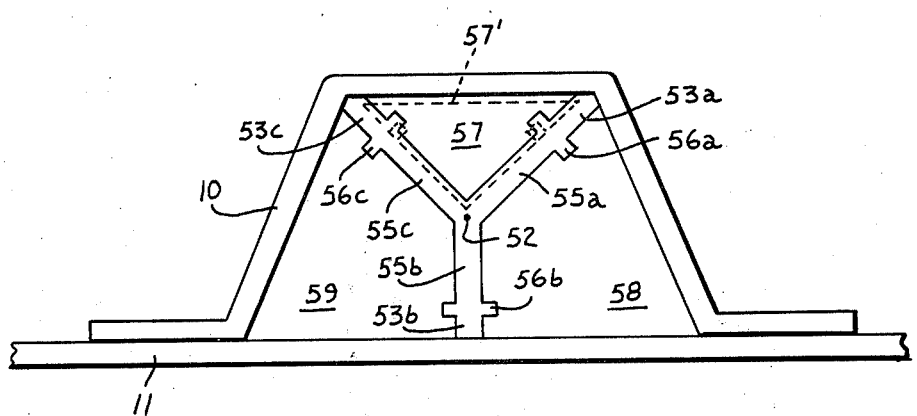
Fig_8
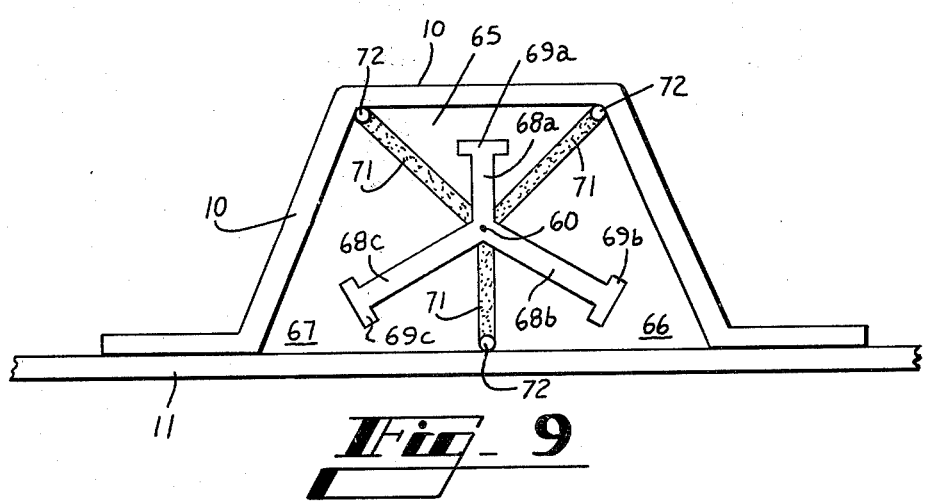
Fig_9

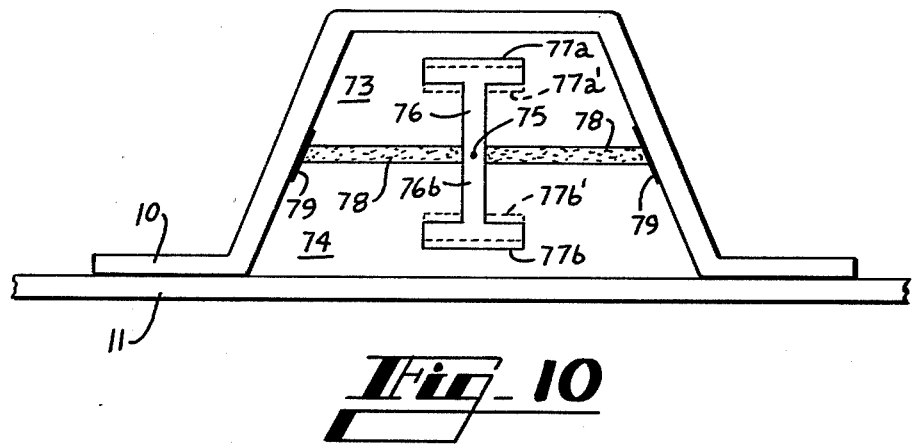
Fig_10
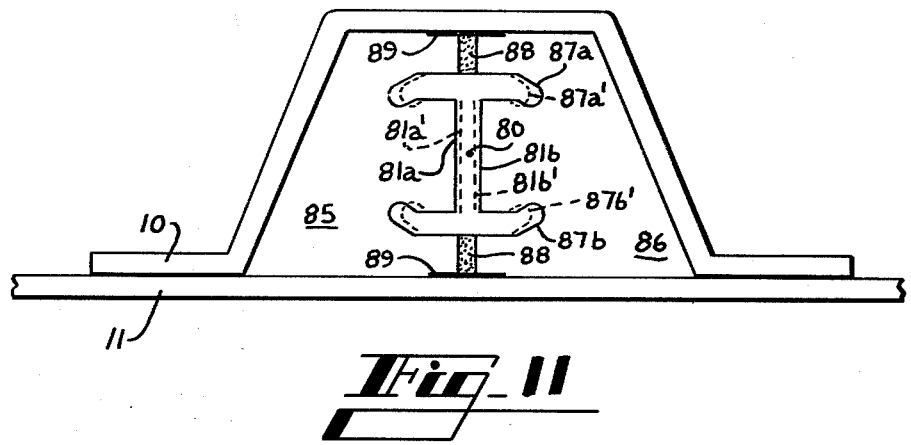
Fig_11

SELF-SUPPORTING SHRINKING MANDREL

TECHNICAL FIELD

The present invention relates to mandrels and particularly to mandrels suited for use in the formation of composite support members for aircraft.

BACKGROUND OF THE INVENTION

In the twentieth century materials science has made great strides, particularly in the area of strong, lightweight members. The development of aircraft in the twentieth century has particularly spawned the development of lightweight structures which can withstand a great deal of stress and torsion without adding an undue amount of weight to an aircraft.

One of the most commonly used structures in the construction of aircraft are composite support members, particularly hat section stiffeners which commonly take the form of trapezoidal support members attached to the surfaces to which they provide support.

It is common in the state of the art to construct hat section stiffeners and composite supports from epoxy plastic interspersed with fibers of boron, graphite, or glass. In the formation of these structures the combination is usually heated to a temperature between 200 and 400° F. in order to set and cure the composite. More recent developments include the use of thermoplastic composites which are formed into hat section stiffeners by heating a sheet of material which is placed over a mandrel defining the shape of the stiffener and the cooled.

Other composites are also set and cooled at temperatures more closely resembling room temperature.

In the making of composite stiffener sections, particularly those of the epoxy and fiberglass type, great difficulty has been encountered in providing mandrels about which the stiffener sections may be formed and which may be readily withdrawn from the completed stiffener section once the setting of the composite has been effected. It has proven difficult to provide suitable mandrel materials which satisfy the following criteria. Suitable mandrels must be able to withstand the temperatures encountered in curing the composite sections without either losing their rigidity or expanding an unacceptable amount due to the elevated temperature. Upon cooling the mandrel material should be easy to remove from the completed stiffening section. The mandrel must also be able to withstand the stress encountered in withdrawing the mandrel material from elongated stiffener sections which have been completed.

The difficulties encountered in providing suitable forms or mandrels for formation of composite stiffening sections has led the use of lightweight foam forms which remain within the stiffener section once it has been set. The use of such a scheme for forming composite stiffeners adds additional unnecessary weight to the completed structure since the foam makes no significant contribution to the structural integrity of the completed stiffener section but does add weight.

Solid forms of aluminum or plastic can be used to form short lengths of composite stiffeners but are difficult or impossible to remove when long lengths are required, particularly when the stiffener runs over an arcuate surface such as a wing or along the length of a fuselage.

Salt mandrels have been proposed but they have undesirable characteristics under the elevated temperatures commonly encountered in composite formation and require a laborious and time consuming step of dissolution and flushing upon completion of the composite.

SUMMARY OF THE INVENTION

The present invention overcomes the aforementioned shortcomings of the prior art by providing a mandrel which is both easy to use and physically stable under the normal conditions encountered in the formation of composite sitffener sections and which also may be readily and easily removed upon completion of the curing and setting process.

The present invention provides such a mandrel by providing an actuator with N (N being an integer greater than one) legs extending radially from the longitudinal axis of the actuator. Each of the legs includes a cross member spaced from the longitudinal axis. N support members are provided with slots or grooves for accepting the cross members on the legs. The cross members extending into the grooves of each support member grip each support member in a fashion which prevents its withdrawal radially from the longitudinal axis of the actuator. Therefore the entire mandrel structure is self supporting when initially assembled.

In a preferred form of the invention the width and depth of the grooves in the support members are constant along the length of the actuator while the distance between longitudinal axis and the geometric center of the cross members diminishes, together with the thickness of the legs, as one proceeds from the root end of the actuator member to the tip end. Therefore, in a plurality of cross sections taken in planes perpendicular to the longitudinal axis of the actuator, the cross section of the actuator diminishes between the root and the tip.

Since the cross members continue to grip each of the support members to prevent radial (from the longitudinal axis of the actuator) movement of the support members, the support members will be drawn in toward the longitudinal axis of the actuator as the actuator is withdrawn longitudinally root first. It will therefore be appreciated that the mandrel of the present invention provides a positive shrinking action upon withdrawal of the actuator and will overcome the problems that have been encountered in the prior art with mandrels remaining within cured and set composite stiffener sections.

In a second form of the present invention each leg and cross member fits directly into an appropriately formed slot. Thus the presence of the cross member directly in slidable engagement with a slot designed to accept the member provides the mandrel with its self supporting feature. In the second form, the distance between the geometric center or lower edge of the cross member and the longitudinal axis of the actuator diminishes in cross sections taken perpendicular to the longitudinal axis as cross sections are taken from the root toward the tip of the actuator.

In all forms of the present invention the outer dimensions of the support members may be of either constant cross section or tapered cross section depending on the ultimate shape of the composite section to be formed around the mandrel.

It will also be appreciated that mandrels in the form of the present invention may be formed with actuator members and support members having a curvature of the longitudinal axis and thus may be used to form composite sections over wind areas and along the fuselage of aircraft. Of course the mandrel of the present invention is useful in other environments in which a reusable easily withdrawn form is needed about which to work any maleable or settable material.

It will therefore be appreciated that it is an object of the present invention to provide an improved mandrel particularly suited for use in the formation of epoxy resin composite support structures in which elevated temperatures are encountered during formation of the structures.

It is still a further object of the present invention to provide a mandrel which is self supporting, easily withdrawn from the completed structure, and reusable.

It is a further object of the present invention to provide an improved mandrel wherein withdrawal of an actuator arm provides a positive shrinking action which pulls the support members of the mandrel away from the workpiece which has been formed about the mandrel.

These and other objects of the present invention will be appreciated from the detailed description of the several embodiments below.

BRIEF DESCRIPTION OF THE DRAWINGS

FIG. 1 is a pictorial view of a typical hat section stiffener composite structure.

FIG. 2 is an elongated pictorial view of an embodiment of the present invention with part of the support members shown broken away.

FIG. 3 is a cross section taken along line 3—3 in FIG. 2.

FIG. 4 is a cross section taken along line 4—4 in FIG. 2.

FIG. 5A is a front elevational cross section of the support members of an embodiment of the present invention.

FIG. 5B is a front elevational cross section of the root end of an embodiment of the actuator of the present invention.

FIG. 5C is a front elevational cross section of the tip of the actuator shown in FIG. 5B.

FIG. 6 is a pictorial view of a separate actuator for an embodiment of the present invention.

FIG. 7 is a side elevational view of another actuator for an embodiment of the present invention.

FIG. 8 is a front elevational cross section of a three legged embodiment of the present invention.

FIG. 9 is a front elevational cross section of a second three legged embodiment of the present invention.

FIG. 10 is a front elevational cross section of a two legged embodiment of the present invention.

FIG. 11 is a front elevational cross section of a second two legged embodiment of the present invention.

DETAILED DESCRIPTION

The construction and operation of the present invention may be appreciated from the following description with reference to the figures in which like numerals reference like parts. FIG. 1 is a pictorial view of a typical hat section stiffener 10 used to support a structural member 11. It is to be appreciated that the form of hat section stiffener 10 is typical and that other forms may be created by using the mandrel of the present invention.

In the environment of aircraft construction it will be appreciated that structural member 11 may be a part of an airfoil surface of an airplane wing, a fuselage, or some other element of an aircraft. The interior of hat section stiffener 10 is shown as 12 and, as will be appreciated by those skilled in the art, is preferably constructed to be hollow thus taking maximum advantage of the structural support provided by section 10 while minimizing the weight of the entire structure.

As will also be appreciated by those skilled in the art the conventional forming of hat sections such as section 10 is a process in which interior portion 12 is filled with a mandrel or some other form about which the section is set.

Turning to FIG. 2, a first preferred form of the present invention may be seen. In FIG. 2 part of support members 15–18 are cut away toward the rear of the mandrel. As may be seen from FIG. 2 the first preferred embodiment of the present invention has an actuator 20 which in cross section generally takes the shape of a Jerusalem cross. The actuator is characterized by a longitudinal axis shown as 22 in the drawing.

Actuator 20 is inserted in a plurality of support members 15, 16, 17, and 18. The space between supports members 15–18 is filled with an appropriate filler material 21 which may be a jelly, a high temperature alkyd di isocynate foam or some other frangible material which may be crushed once the composite section is formed as will be described further hereinbelow. Lines 3—3 and 4—4 show cross sections which are depicted in FIGS. 3 and 4, respectively.

FIG. 3 shows the root end of actuator 20, the root end being the end having a larger cross section than the tip end. As used herein the term "cross section," unless otherwise defined, refers to cross sections perpendicular to longitudinal axis 22 of actuator 20. In the cross section of FIG. 3 it may be seen that actuator 20 includes four legs 24a–24d extending radially from longitudinal axis 22. Each of legs 20 is terminated by one of cross members 25a–25d. Since cross members 25 are wider at their distal ends than legs 24, it may be seen that each of support members 15–18 includes an area adjacent to legs 24 which is "gripped" by the combination of legs 24 and cross members 25 so that each respective cross member may not be moved radially away from longitudinal axis 22. Therefore it will be appreciated that the mandrel shown in FIG. 3 is self supporting due to the presence of the cross members.

It will further be appreciated that it is the fact that cross members 25 are wider than legs 24 which provides this support feature and therefore the term cross member as used herein should be generically considered to include any geometric shape spaced away from longitudinal axis 22 on one of legs 24 which is wider than the proximal end of leg 24 which serves to hold one of support members 15–18 in place. Therefore the equivalents of the cross members 25 shown in FIG. 3 will include circular, bulbous, triangular or other similarly enlarged distal portions of legs 24 which serve an equivalent function to hold support members 15–18 together.

In the first preferred form of the invention spaces between support members 15–18 are filled with a jelly, appropriate foam, or other frangible material.

FIG. 4 shows a cross section taken along line 4—4 in FIG. 2. Note in FIG. 4 that each of dimensions A', B' and C' correspond to dimensions A, B and C of actuator 20 shown in FIG. 3. FIG. 4 illustrates that dimensions A'–C' are diminished toward the tip end of actuator arm 20 and that cross members 25a–25d are closer to longitudinal axis 22 at the tip end shown in FIG. 4 than at the root end shown in FIG. 3. It will therefore be appreciated that withdrawal of actuator 20 along longitudinal axis 22 in the direction of a line extending from the tip end to the root end will cause cross members 25 to pull support members 15-18 closer together. This provides the positive shrinking feature of a mandrel according to the present invention upon withdrawal of actuator 20.

Note that it is the shrinkage of legs 24a-24d both in length and width which causes the actuator of the first preferred embodiment to positively collapse the mandrel when the actuator is withdrawn. In the first preferred embodiment frangible material in voids 21 will be crushed and may thus be easily removed when the entire mandrel is removed from the formed composite. It will thus be appreciated from FIGS. 2-4 in reference to FIG. 1 that the positive shrinking action of the mandrel will pull support members 15-18 away from the interior 12 of hat section 10 once the section is set and cured. This allows the mandrel to be easily removed leaving hat section 10 appropriately hollow to minimize the weight of the entire structure and also allows the mandrel to be reused.

Turning now to FIGS. 5A-5C a second preferred form of the present invention may be seen. FIG. 5A shows support members 15-18 which may be identical to those shown in FIGS. 2 and 3. It is to be understood that FIG. 5B shows a cross section of an actuator for the second preferred embodiment of the present invention taken at the root end and that FIG. 5C shows a cross section of the same actuator taken at the tip end.

Turning first to FIG. 5A it will be appreciated that distances a, b and c remain constant along cross sections of support members 15-18. It will further be appreciated that distances d, e and f representing the outside dimensions of support member 15 may be constant or may be tapered in cross sections taken from the root end to the tip end depending on the desired final form of the composite section to be made using the mandrel. It will be appreciated that similar outside dimensions for support members 16-18 may also be varied according to the desired shape of the final composite section.

As may be seen in FIG. 5A each of support members 15-18 includes a pair of grooves on adjacent sides of the member. For example support member 15 has groove 35a on one side and groove 35b on its adjacent side. Similarly support member 16 includes groove 36a and groove 36b on the side adjacent to the side containing groove 36a. It will be apparent from the foregoing description of FIGS. 2 and 3 and the following description of FIGS. 5B and 5C that cross members 28a-28d are inserted into grooves 35a-35b when the second preferred embodiment of the present invention is used.

Turning now to FIG. 5B the root end of the actuator member of the second preferred embodiment is shown in cross section. Four legs 27a-27d extend radially from longitudinal axis 26. In the second preferred embodiment a cross section of the actuator member also includes extensions 29a-29d at the end of each of legs 27a-27d, respectively. Extensions 29 fill the spaces between support members 15-18 which are filled with frangible material 21 in the first preferred embodiment shown in FIG. 3. In taking cross sections of the actuator member from the root end toward the tip end the cross section eventually takes the form shown at the tip end in FIG. 5C. Note that the distance between inner edges of cross members 28a and 28c is shown as H1 in FIG. 5B at the root end and diminishes to distances H2 shown in FIG. 5C.

Note however that the distance "a" remains constant and corresponds to the distance "a" shown in FIG. 5A. Similarly dimension c, the width of cross members 28 remains constant and corresponds to the width of grooves 35a-35b and support members 15-18. Likewise distance b remains constant. It will thus be appreciated that withdrawal of the actuator shown in FIGS. 5A and 5B will cause the positive shrinking of the mandrel to withdraw support members 15-18 from the inner portion 12 of hat section 10 as shown in FIG. 1.

From the foregoing description it will be apparent that the second preferred embodiment provides a mandrel having N support members N being equal to four. It will further be appreciated that each of the four support members includes a pair of grooves, for example grooves 35a and 35b in support member 15, with each of the pair of grooves being disposed on two adjacent sides of support member 15. It will also be appreciated from FIGS. 5B and 5C that the mandrel comprises an actuator member characterized by longitudinal axis 26 having four legs 27a-27d extending radially from axis 26. It can be seen that each of the legs includes a cross member, one of cross members 28a-28d which is aligned for slidable engagement with grooves 35a-38b and that each of the cross members is aligned for engagement with two grooves on two adjacent supporting members. For example it may be seen that cross member 28a in FIG. 5B is aligned for slidable engagement with grooves 35a and 38a shown in FIG. 5A. From FIGS. 5B and 5C it may be seen that the actuating member is of diminishing cross section when one moves from the root end (FIG. 5B) to the tip end (FIG. 5C).

In FIG. 6 a separate actuator of the pull type is shown. Again the actuator includes four legs 45a-45d and is generally of the form shown in the first preferred embodiment. The actuator includes an attachment 40 at the root end of the actuator by which the actuator may be pulled out of a form composite in the direction of arrow 41 once the composite has been set and cured.

In the use of this type of arrangement, the mandrel would originally be formed with a cruciform member of constant cross section holding the supporting members. When the mandrel is to be removed, the cruciform member would then be withdrawn. Then the separate actuator shown in FIG. 6 would be inserted and pulled through the grooves of the support members, causing the support member to be pulled from the interior of the composite. It will therefore be appreciated that the root end of the actuator of FIG. 6 should be of the same cross section as the original cruciform member.

FIG. 7 shows a side elevational view of a push type actuator having a longitudinal axis 46. Note that the actuator of FIG. 7 includes a first section 47 which is tapered in cross section going from root end 49 towards tip end 50. Portion 47 of the actuator of FIG. 7 serves to provide the positive shrinking function referred to hereinabove when the actuator is withdrawn. The remaining length 48 of the actuators of constant cross section. The actuator of FIG. 7 works in the same manner as that of FIG. 6 except that it is pushed through the mandrel rather than pulled.

FIGS. 8 and 9 show N legged, N support member, embodiments of the present invention where N equals 3. FIG. 8 is a front elevational cross section showing composite hat section 10 with the mandrel inserted therein. Note that the actuator of this embodiment of the invention includes three legs 55a-55c extending radially from longitudinally axis 52. Each of legs 55a–55c includes one of cross members 56a–56c.

In the embodiment shown in FIG. 8 legs 55a–55c also include extensions 53a–53c analogous to extensions 29 of the second preferred embodiment shown in FIG. 5B.

The embodiment shown in FIG. 8 is constructed, as with the previous embodiments, so that the distance between longitudinal axis 52 and cross members 56a–56c diminish as cross sections are taken going from the root end of the actuator to the tip end. The displacement of support member 57 which results from the actuator being withdrawn is shown in phantom as 57' in FIG. 8. It is to be understood that the preferred form of the present invention would also cause support members 58 and 59 to be similarly displaced toward longitudinal axis 52 upon withdrawal of the actuator.

In FIG. 9 yet another three legged embodiment of the present invention is shown wherein three legs 68a, 68b and 68c extend radially from longitudinal axis 60. As may be seen from FIG. 9 each of legs 68 slidably engages a slot (shown as filled by the legs) provided in each of support members 65–67, respectively. In this embodiment each of legs 68a–68c is terminated by one of cross members 69a–69c. It is to be understood that as cross sections are taken from the root end (as shown in FIG. 9) towards the tip end that the distance between cross members 69a–69c and longitudinal axis 60 diminishes while the width of legs 68a–68c may remain constant. Thus withdrawal of the actuator will effect the positive shrinking action of the entire mandrel drawing support members 65, 66 and 67 inwardly toward longitudinal axis 60.

In the embodiment shown in FIG. 9 the spaces between support members 65–67 are filled with a foam material 71 of the same type shown as filler 21 in FIG. 3 and are sealed by appropriate sealing members 72. Therefore when the actuator is withdrawn along longitudinal axis 60 filler element 71 will be crushed in order to allow the necessary displacement of members 65, 66 and 67.

FIGS. 10 and 11 show elevational cross sections of embodiments of the present invention where N equals 2, that is where the actuator comprises two legs extending radially from the longitudinal axis and using two support members.

In FIG. 10 legs 76a and 76b extend radially from longitudinal axis 75 and are transversed to the spaces between support members 73 and 74 which are filled with frangible material 78 and sealed by appropriate sealing member 79.

In FIG. 11 legs 81a and 81b extend radially from longitudinal axis 80 and are colinear with voids filled by frangible material 88 and sealed by sealing members 89. It will thus be appreciated that the embodiment of FIG. 10 where N equals two is an analog of the N equals three embodiment of FIG. 9 and bears the same relationship to the embodiment of FIG. 11 (N equals two) as the embodiment of FIG. 9 bears to the embodiment of FIG. 8. It will of course be apparent that frangible material 88 may be replaced by extensions of legs 81a and 81b as will be appreciated from the foregoing discussions of the embodiments of FIGS. 8 and 5.

In FIG. 10 an elevational cross section of the root end of the mandrel may be seen. Legs 76a and 76b are each terminated by cross members 77a and 77b, respectively. Voids between support members 73 and 74 are filled with frangible material 78 which will be crushed upon withdrawal of the actuator. It will be apparent from the foregoing discussions of operations of the present invention that the width of legs 76a and 76b may remain constant along cross sections taken from the root to the tip. The location of cross members 77a and 77b at the tip end of the actuator are shown in phantom as 77a', respectively.

Therefore withdrawal of the actuator along longitudinal axis 75 shrinks the mandrel by bringing support members 73 and 74 together crushing frangible material 78 thus providing the positive shrinking action. Since each of legs 76 and cross members 77 are slidably engaged in a groove in support members 73 and 74, it may be seen that the mandrel is also self supporting as was the case with the other embodiments of the present invention shown herein.

In FIG. 11 yet another embodiment with N equal to two is shown having support members 85 and 86. In this embodiment legs 81a and 81b extend radially from longitudinal axis 80 and are terminated by cross members 87a and 87b. Note the cross members 87a and 87b have arcuate ends which are turned in toward longitudinal axis 80.

As mentioned hereinabove the remaining space between support members 85 and 86 may be filled with frangible material 88 (as shown in FIG. 11) or may be filled with extensions of legs 81 analogous to extensions 53 of the embodiment shown in FIG. 8.

The shape of the tip end of the actuator of the embodiment in FIG. 11 is shown in phantom therein. The tip end of cross members 87a and 87b are shown as phantoms 87a' and 87b', respectively. The sides of legs 81a and 81b at the tip end are shown in phantom as 81a' and 81b', respectively. Note that in the embodiment of FIG. 11 the width of legs 81a and 81b diminishes in cross section as one travels from the root end to the tip end thus drawing the distal ends of cross members 87a and 87b inwardly toward longitudinal axis 80 upon withdrawal of the actuator. The diminishment in cross section of the actuator member again draws the support members, in this instance 85 and 86, together providing the positive shrinking action which will thus allow the mandrel to be easily removed from formed hat section 10.

The arcuate or bent ends of cross members 87a and 87b are provided to give the mandrel the self supporting feature that is present in the other embodiments. From the foregoing description of various embodiments of the present invention it will be appreciated that the present invention fulfills the object set forth hereinabove and overcomes the above recited problems which have been encountered in the prior art. It will also be apparent that other embodiments of the present invention in addition to those described in detail herein may be constructed within the scope of claims below.

I claim:

1. An improved mandrel comprising in combination:
   N support members, N being an integer greater than two;
   each support member of said N support members including a pair of grooves, one groove of said pair of grooves being disposed on each of two adjacent sides of said support member;
   an actuator member characterized by a longitudinal axis;
   said actuator member including N legs extending radially from said longitudinal axis;
   each of said legs including a cross member of predetermined constant width in cross sections perpendicular to said longitudinal axis aligned for slidable engagement with at least two of said grooves on two adjacent support members of said N support members; and wherein for each said cross member supported by one leg of said N legs, said actuator member is characterized by a diminishing minimum distance between a distal edge of said cross member and said longitudinal axis and a constant minimum distance between said distal edge and a next adjacent leg of said N legs, and the width of each of said legs diminishes in proportion to said diminishing minimum distance between said distal edge of said cross member and said longitudinal axis in cross sections taken from a root end to a tip end in planes perpendicular to said longitudinal axis.

2. An improved mandrel comprising in combination:

an actuator member characterized by a longitudinal axis;

said actuator member including N legs extending radially from said longitudinal axis, N being an integer greater than two;

each of said legs including a cross member of predetermined constant width in cross sections perpendicular to said longitudinal axis spaced from said longitudinal axis;

N support members, each of said support members including a slot for slidably engaging one of said N legs; and wherein for each said cross member supported by one leg of said N legs, said actuator member is characterized by a diminishing minimum distance between a distal edge of said cross member and said longitudinal axis and a constant minimum distance between said distal edge and a next adjacent leg of said N legs, and the width of each of said legs diminishes in proportion to said diminishing distance between said distal edge of said cross member and said longitudinal axis in cross sections taken in planes perpendicular to said longitudinal axis from a root end to a tip end.

3. The mandrel of claim 1 further comprising an extended portion of said actuator member attached to said tip end of constant cross section equal to the cross section at said tip end.

4. A mandrel as recited in claim 1 wherein each said cross member is characterized by a length along a line substantially perpendicular to the axis of the leg of said N legs supporting said cross member, and said length diminishes in said cross sections taken from a root end to a tip end in planes perpendicular to said longitudinal axis.

5. The mandrel of claim 2 further comprising an extended portion of said actuator member attached to said tip end of constant cross section equal to the cross section at said tip end.

6. A mandrel as recited in claim 2 wherein each said cross member is characterized by a length along a line substantially perpendicular to the axis of the leg of said N legs supporting said cross member and said length diminishes in said cross sections taken from a root end to a tip end in planes perpendicular to said longitudinal axis.

* * * * *